United States Patent
Trokhan

[19]

[11] Patent Number: 6,165,585
[45] Date of Patent: *Dec. 26, 2000

[54] LAMINATED FIBROUS STRUCTURE AND METHOD FOR MANUFACTURING SAME

[75] Inventor: Paul Dennis Trokhan, Hamilton, Ohio

[73] Assignee: The Procter & Gamble Company, Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/934,406

[22] Filed: Sep. 19, 1997

[51] Int. Cl.$^7$ .............................. B32B 3/06; B32B 31/00
[52] U.S. Cl. ...................... 428/101; 428/102; 428/154; 428/166; 428/172; 428/198; 156/290; 156/292
[58] Field of Search ............................ 428/99, 100, 120, 428/154, 156, 172, 101, 102, 166, 198; 156/60, 290, 291, 292

[56] References Cited

U.S. PATENT DOCUMENTS

| | | | |
|---|---|---|---|
| D. 239,137 | 3/1976 | Appleman | D59/2 A |
| 3,414,459 | 12/1968 | Wells | 161/131 |
| 3,547,723 | 12/1970 | Gresham | 156/209 |
| 3,556,907 | 1/1971 | Nystrand | 156/470 |
| 3,684,603 | 8/1972 | Iltis . | |
| 3,708,366 | 1/1973 | Donnelly | 156/209 |
| 3,738,905 | 6/1973 | Thomas | 161/127 |
| 3,867,225 | 2/1975 | Nystrand | 156/209 |
| 3,940,529 | 2/1976 | Hepford et al. | 428/178 |
| 3,961,119 | 6/1976 | Thomas | 428/178 |
| 4,100,017 | 7/1978 | Flautt | 428/154 |
| 4,208,459 | 6/1980 | Becker et al. | 428/154 |
| 4,320,162 | 3/1982 | Schulz | 428/154 |
| 4,325,773 | 4/1982 | Schulz | 156/471 |
| 4,483,728 | 11/1984 | Bauernfeind | 156/209 |
| 4,487,796 | 12/1984 | Lloyd et al. | 428/154 |
| 4,543,142 | 9/1985 | Kuepper . | |
| 4,659,608 | 4/1987 | Schulz | 428/171 |
| 4,921,034 | 5/1990 | Burgess et al. | 162/109 |
| 5,269,983 | 12/1993 | Schulz | 364/25 |
| 5,294,475 | 3/1994 | McNeil | 428/154 |
| 5,356,364 | 10/1994 | Veith et al. | 493/395 |
| 5,468,323 | 11/1995 | McNeil | 156/209 |
| 5,503,896 | 4/1996 | Veith et al. | 428/141 |
| 5,529,563 | 6/1996 | Veith et al. | 493/395 |
| 5,614,281 | 3/1997 | Jackson et al. | 428/100 |
| 5,691,021 | 11/1997 | Kobe | 428/100 |

FOREIGN PATENT DOCUMENTS

| | | |
|---|---|---|
| 2 383 708 | 10/1978 | France . |
| 2 234 937 | 2/1991 | United Kingdom . |
| 97/37082 | 10/1997 | WIPO . |

*Primary Examiner*—Donald Loney
*Attorney, Agent, or Firm*—Vladimir Vitenberg; Larry L. Huston; Donald E. Hasse

[57] ABSTRACT

A laminated fibrous structure comprising at least two fibrous sheets and a method for manufacturing same are provided. At least one, and preferably two, of the fibrous sheets may be embossed. The sheets are movably joined together in a face-to-face relationship to form a laminated structure such that the sheets are able to move relative each other during the use of the laminated structure by a consumer, without tearing or separation of any one of the sheets comprising the laminated structure. The sheets comprising the laminated structure may be movably joined by using a bonding material, by mechanically engaging upstanding fibers created on the interfacing surfaces of the sheets, or by a combination of the bonding material and engaging the upstanding fibers.

19 Claims, 8 Drawing Sheets

LAMINATED FIBROUS STRUCTURE AND METHOD FOR MANUFACTURING SAME

FIELD OF THE INVENTION

The present invention generally relates to laminated fibrous structures and to methods for manufacturing same. In particular, the present invention concerns a laminated structure comprising two or more laminae which are movable relative to each other without separation or tearing of either one of the laminae.

BACKGROUND OF THE INVENTION

Laminated fibrous structures and methods for their manufacturing are well known in the papermaking art. Laminated fibrous structures are created by a variety of ways, including embossing two or more individual fibrous sheets (also called plies or laminae) and adhesively joining them together. The resulting laminates have been employed for a variety of products ranging from packaging and construction materials to household paper products, such as paper tissues, table napkins, place mats, paper towels, and the like.

To perform their intended tasks and to find wide acceptance, the household laminated paper products must exhibit certain physical characteristics. A typical consumer desires the household paper product to have a high quality cloth-like appearance, a relatively thick caliper, and an aesthetically pleasing pattern. All of these physical characteristics must be provided without sacrificing the other desired qualities of strength, softness, and absorbency of the paper product.

Strength is the ability of a paper web to retain its physical integrity during use.

Softness is the pleasing tactile sensation customers perceive when they crumple the paper in their hands and while using the paper for its intended purposes.

Absorbency is the characteristic of the paper which allows it to take up and retain fluids, particularly—water and aqueous solutions and suspensions. In evaluating the absorbency of paper, not only is the absolute quantity of fluid a given amount of paper will hold significant, but the rate at which the paper will absorb the fluid is also important. In addition, when the paper is formed into a product such as a towel or wipe, the ability of the paper to cause a fluid to be taken up into the paper and thereby leave a dry wiped surface is also important.

It is well known in the papermaking art that embossing generally increases absorbency, softness and bulk of the household paper products, such as toilet tissue, paper towel, napkins and the like. There are several common patterns of embossed laminated paper structure intended for the household products: nested (also known as "mated" or "male-female") pattern, knob-to-knob pattern, continuous pattern, and dual ply lamination. All these patterns are associated with the use of a pair of patterned, and axially parallel embossing rolls. During the process, the embossed sheets of paper are fed through a nip formed between two juxtaposed embossing rolls. Discrete protuberances or raised continuous surfaces on the embossing rolls compress regions of each sheet into engagement and contacting relationship with the opposing sheet according to a preselected pattern. The compressed regions of the sheets provide for joining of and maintaining the sheets in a face-to-face contacting relationship.

Specifically, in a knob-to-knob pattern, the discrete protuberances (or "knobs") on one embossing roll are registered with the protuberances on the opposing embossing roll. In a nested pattern, the protuberances of one embossing roll mesh between the protuberances of the other embossing roll. In the continuous pattern, the raised continuous surfaces (as opposed to the discrete protuberances of the knob-to-knob pattern) of one of the embossing rolls are registered with the raised continuous surfaces of the other roll. The knob-to-knob pattern is described in the commonly assigned U.S. Pat. No. 3,414,459 issued to E. R. Wells on Dec. 3, 1968, which patent discloses the compressible paper structures formed by embossing identical raised patterns of discrete protuberances on two extensible paper sheets. The mated distal surfaces of the embossed protuberances are adhesively joined, and the resulting laminated paper structure is calendered. This patent is incorporated by reference herein. The dual ply lamination type is disclosed in the commonly assigned U.S. Pat. Nos. 5,294,475, issued on Mar. 15, 1994 to McNeil and 5,468,323 issued on Nov. 21, 1995 to McNeil, which patents are incorporated by reference herein. The McNeil patents disclose a dual ply laminate having two laminae which are embossed such that each embossed site of one lamina is adhesively joined to the non-embossed region of the other lamina.

The examples of various patterns are illustrated in the prior art by U.S. Pat. No. 3,547,723, issued Dec. 15, 1970 to Gresham; U.S. Pat. No. 3,556,907 issued on Jan. 19, 1971 to Nystrand; U.S. Pat. No. 3,708,366, issued Jan. 2, 1973 to Donnelly; U.S. Pat. No. 3,738,905, issued Jan. 12, 1973 to Thomas; U.S. Pat. No. 3,867,225 issued Feb. 18, 1975 to Nystrand; U.S. Pat No. 4,483,728 issued Nov. 20, 1984 to Bauernfeind; U.S. Pat. No. 4,921,034 issued May 1, 1990 to Burgess; U.S. Pat. No. 5,269,983 issued Dec. 14, 1993 to Schulz; U.S. Pat. No. 5,356,364, issued Oct. 18, 1995 to Veith et al.; U.S. Pat. No. 5,503,896 issued Apr. 2, 1996 to Veith et al.; and U.S. Pat. No. 5,529,563 issued Jun. 25, 1996 to Veith et al. The commonly assigned U.S. Pat. Des. No. 239,137 issued Mar. 9, 1976 to Appleman illustrates an embossing pattern found on commercially successful paper toweling.

Different attempts have been made in the art to improve upon the embossments caused by the embossing process. For example, attempts have been made to provide embossed patterns having different depths, and asymmetric embossments. Other attempts have been made in the art to provide embossments having a certain size and representing a particular surface area of the embossed sheet. Yet other attempts in the art teach a particular angle, relative to the machine direction of manufacture, for the embossments. Still another attempts have been made in the art to provide embossments having particular configuration. Other attempts teach particular sizes of the protuberances and the corresponding recesses on the juxtaposed embossing rolls. Examples of the attempts to improve upon the embossments are illustrated in U.S. Pat. No. 4,320,162, issued Mar. 16, 1982 to Schulz, et al; U.S. Pat. No. 4,659,608, issued Apr. 21, 1988 to Schulz; U.S. Pat. No. 4,921,034 issued May 1, 1990 to Burgess et al; U.S. Pat. No. 3,940,529, issued Feb. 24, 1976 to Hepford, et. al; U.S. Pat. No. 4,325,773, issued Apr. 20, 1982 to Schulz; U.S. Pat. No. 4,487,796, issued Dec. 11, 1984 to Lloyd et. al; and U.S. Pat. No. 3,961,119, issued Jun. 1, 1976 to Thomas.

Regardless of the particular type of embossing and pattern of lamination, paper laminates of the prior art are formed by rigidly binding two or more sheets of paper together to create a laminated structure. The individual sheets of a laminated structure of the prior art are joined in a number of ways, including both adhesive bonding and mechanical bonding. Lamination/embossing is known to be helpful to increase caliper of the laminated structure and compressibility normal to the plane of the laminated structure, and therefore—to increase the softness associated with the increased compressibility of the structure. An increase in caliper also generally improves the absorbency of the laminated product. At the same time, lamination/embossing of the prior art tends to reduce flexibility of the resulting laminated structure—because the adhesive or mechanical joining utilized by the prior art to bind two or more laminae together forms a rigid connection between the two or more laminae. The increase in caliper, while providing a higher compressibility and associated softness, decreases flexibility of the laminated structure of the prior art. In other words, a trade-off exists between the caliper and compressibility/softness of a laminated structure achieved by lamination and the flexibility of the laminated structure.

Therefore, it is an object of the present invention to decouple the caliper and softness of a laminated structure from the flexibility of the laminated structure.

It is another object of the present invention to produce a strong, soft and flexible laminated structure comprising two or more sheets which are movable relative to each other without separation or tearing of either one of these sheets.

It is still another object of the present invention to provide a process for producing such a laminated structure.

SUMMARY OF THE INVENTION

In its product aspect, a laminated fibrous structure of the present invention comprises at least a first fibrous sheet and a second fibrous sheet. At least one of the first sheet and the second sheet may be embossed. The first sheet and the second sheet are joined together in a face-to-face relationship to form a laminated structure such that the first sheet and the second sheet are able to move (preferably laterally) relative each other during the use of the laminated structure by a consumer, without tearing or separation of any one of at least the first sheet and the second sheet comprising the laminated structure. The first sheet and the second sheet of the laminated structure may be movably joined together by a bonding material which allows relative movement between the first sheet and the second sheet. The first sheet and the second sheet may be movably joined together by creating areas of upstanding fibers on the first sheet and the second sheet, and then mechanically engaging the upstanding fibers on the first sheet with the corresponding upstanding fibers on the second sheet. The first sheet and the second sheet may be movably joined together by combining a bonding material and the upstanding fibers on one or both of the first sheet and the second sheet.

In its process aspect, the present invention comprises the steps of providing at least two fibrous sheets and movably joining the sheets together such that the sheets of the resulting laminated structure are movable relative each other without tearing or separation of either one of the sheets. At least one of the sheets may be embossed. If the sheets are to be movably joined by a bonding material, the steps of providing and depositing a bonding material to at least one of the sheets must be performed. If the sheets are to be movably joined by mechanically engaging their respective upstanding fibers, the steps of creating portions of upstanding fibers on the sheets and engaging the upstanding fibers of one sheet with the upstanding fibers of the other sheet must be performed. If the sheets are to be movably joined by a combination of the bonding material and the upstanding fibers, the steps of providing and depositing the bonding material to at least one of the sheets, and the step of creating areas of upstanding fibers on at least one of the sheets must also be performed.

BRIEF DESCRIPTION OF THE DRAWINGS

FIG. 1A schematically shows the process of the present invention for producing a laminated structure comprising two sheets (two-ply structure); and FIG. 1B schematically shows the process of the present invention for producing a laminated structure comprising three sheets (three-ply structure).

FIG. 3A shows a two-ply structure comprising two sheets joined in an aligned knob-to-knob pattern.

FIG. 3B shows a two-ply structure comprising two sheets joined in an off-set knob-to-knob pattern.

FIG. 3C shows a two-ply structure having a dual ply lamination pattern.

FIG. 3D shows a two-ply structure comprising two sheets interposed in a nested pattern.

FIG. 3E and FIG. 3F show a two-ply structure comprising two embossed sheets combined in a nested pattern, each sheet having its own included angle of the embossment, which angle is different from the other sheet's included angle of the embossment. In FIG. 3E, the included angle of the male element of the embossment of one sheet is greater than the included angle of the female element of the embossment of the other sheet. In FIG. 3F, the included angle of the male element of the embossment of one sheet is less than the included angle of the female element of the embossment of the other sheet.

FIG. 3G shows a two-ply structure which comprises an embossed sheet and a non-embossed sheet.

FIG. 3H shows a two-ply structure which comprises two non-embossed sheets.

FIG. 4A and FIG. 4B show a three-ply structure comprising two embossed sheets and one non-embossed sheet intermediate the two embossed sheets.

FIG. 4C shows a three-ply structure comprising two embossed sheets disposed in a knob-to-knob pattern and one non-embossed sheet externally joined to one of the embossed sheets.

DETAILED DESCRIPTION OF THE INVENTION

Laminated Fibrous Structure

Figure 1A:
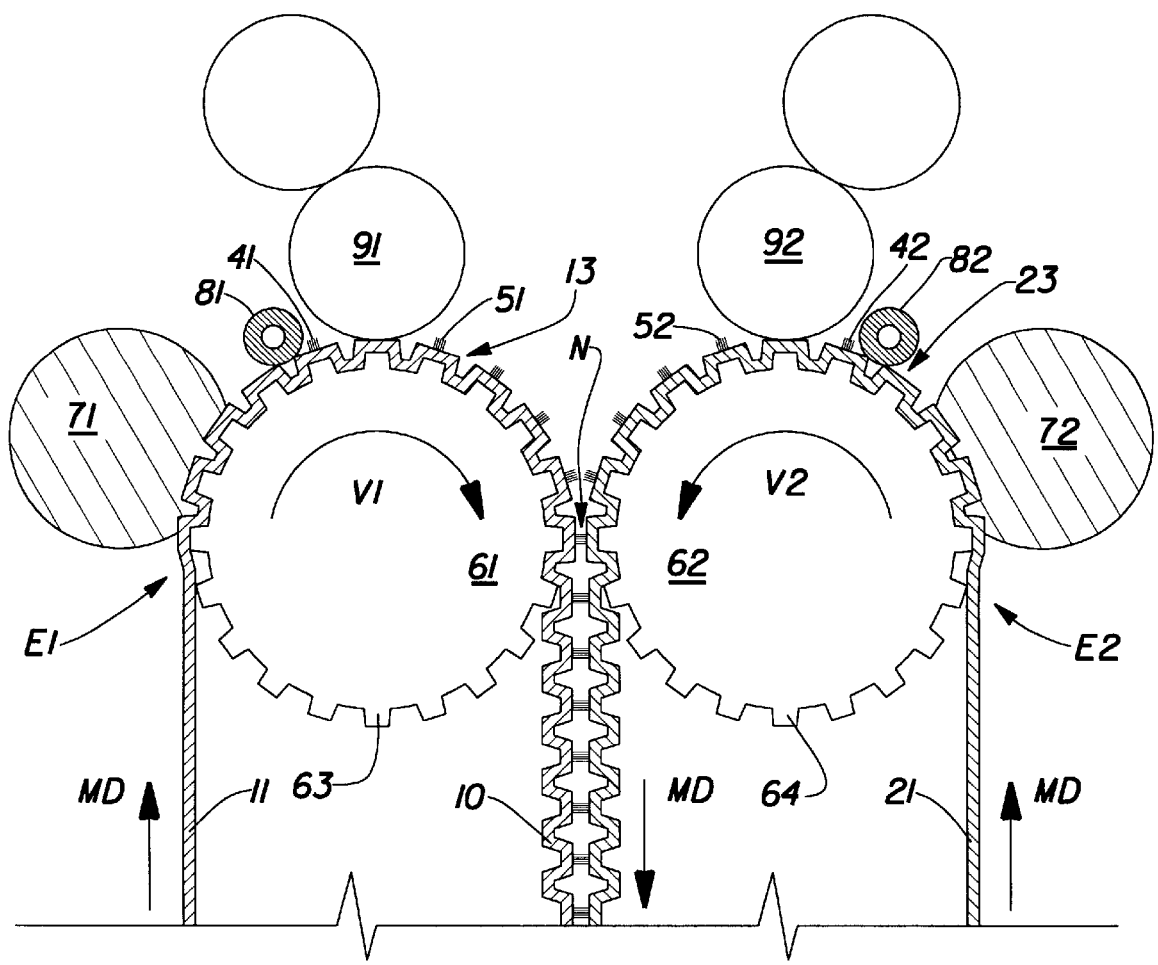
FIGS. 1A and 1B are schematic drawings of the side elevation of equipment for carrying out a process of the present invention.

Referring to FIGS. 3A–4C, the present invention comprises a laminated fibrous structure 10, which herein may also be referred to as "laminated structure 10," or simply "structure 10." The fibers comprising the structure 10 of the present invention may be synthetic, such as polyolefin or polyester. Preferably, however, the fibers are cellulosic, such as cotton linters, rayon or bagasse, and more preferably are wood pulp, such as soft woods (gymnosperms and/or coniferous) and/or hard woods (angiosperms and/or deciduous). As used herein, the fibrous structure 10 is considered "cellulosic" if the fibrous structure 10 comprises at least about 50% by weight or at least about 50% by volume cellulosic fibers, including, but not limited to, those fibers listed above.

If wood pulp fibers are selected for the structure 10 of the present invention, the fibers may be produced by any pulping process, including chemical processes, such as sulfite, sulfite and soda processes, and mechanical processes, such as groundwood. Alternatively, the fibers may be produced by combinations of the mechanical and chemical processes, or may be recycled. The type, combination, and the processing of the fibers used are not critical to the present invention.

The structure 10 of the present invention is macroscopically two-dimensional and planar, although not necessarily flat. The structure 10 does have some thickness in the third dimension. However, the third dimension is relatively small compared to the actual first two dimensions or to the capability to manufacture a cellulosic structure 10 having relatively large measurements in the first two dimensions.

The structure 10 of the present invention comprises two or more individual fibrous laminae or sheets. As used herein, the structure 10 comprising two sheets may also be referred to as a "two-ply" structure; the structure 10 comprising three sheets may also be referred to as a "three-ply" structure, and so on. FIGS. 3A–3G show the structure 10 comprising a first fibrous sheet 11 and a second fibrous sheet 21. At least one of the first sheet 11 and the second sheet 21 may be embossed. FIG. 3H shows that neither the first sheet 11, nor the second sheet 21 may be embossed. Preferably, however, both the first sheet 11 and the second sheet 21 are embossed. FIGS. 3A–3F show the different embodiments of the structure 10 comprising the first sheet 11 and the second sheet 21, both the first sheet 11 and the second sheet 21 being embossed. FIG. 3G shows the embodiment of the structure 10 comprising the first sheet 11 and the second sheet 21, with only the first sheet 11 being embossed. As used herein, the term "embossed" sheet refers to the sheet 11, or the sheet 21 specially treated to have raised portions (or "embossments") 13, 23 projecting generally outward from one of the surfaces of the sheet 11, 21, and usually produced by locally deflecting (or "embossing") portions of the otherwise plane sheet 11, 21 out of the plane of the sheet 11, 21.

According to the present invention, the sheets 11 and 21 can be joined together by any one of the following methods: (1) connecting the sheets 11 and 21 by using a bonding material 51, 52 which would allow the sheets 11 and 21 to remain movable relative each other after the laminated structure 10 has been created; (2) creating upstanding fibers 41 on the first sheet 11 and upstanding fibers 42 on the second sheet 21, and then making the fibers 41 mechanically engage the fibers 42 such as to make the sheets 11 and 21 to join each other and, at the same time, remain movable relative each other after the laminated structure 10 has been created; and (3) combining the method (1) and the method (2), i. e., creating the portions of the upstanding fibers 41 and/or 42 on one or both of the sheets 11 and 21, and then joining the sheets 11 and 21 by using both the bonding material 51 and/or 52 and the upstanding fibers 41 and/or 42. It is believed that the bonding material 51 engaging the upstanding fibers 41 of the first sheet 11 and the surface fibers of the second sheet 21 will facilitate the movable connection of the first sheet 11 and the second sheet 21.

As has been defined above, the embossments 13, 23 project generally outwardly from one of the surfaces of the sheet 11, 21. By the same token, the opposite surface of the paper sheet 11, 21 has depressions (or "debossments") corresponding to the embossments 13, 23. As used herein, each "embossment" has a corresponding "debossment," both terms indicating the same element 13, 23 viewed from the opposite sides of the same sheet 11, 21, and designated— for this reason—by the same numerical reference: 13 for the first sheet 11, and 23 for the second sheet 21.

The embossments/debossments 13, 23 of the sheets 11, 21, respectively, are preferably arranged in a non-random repeating pattern corresponding to the embossing elements 63, 64 of the embossing rolls 61, 62, respectively (FIGS. 1A and 1B), utilized in the embossing process of the present invention and discussed herein below. By being "non-random," the embossments 13, 23 are considered to be disposed in a predictable pattern and may occur as a result of predetermined features of the manufacturing process. As used herein, the term "repeating" applies to a pattern which is formed more than once in the structure 10. By being "discrete," the adjacent embossments 13, 23 are not contiguous. According to the present invention, the embossments/debossments 13, 23 may comprise continuous surfaces forming a continuous pattern of an embossed laminated structure 10.

The rest of the sheets 11, 21 comprises essentially continuous non-embossed regions 15, 25 respectively, as shown in FIGS. 3A–4C and 5. As used herein, the "essentially continuous" non-embossed regions 15, 25 extend substantially throughout the structure 10 in both of its principal plan directions. Normally, the density of the essentially continuous non-embossed regions 15, 25 is less than the density of the embossments 13, 23—because the non-embossed regions 15, 25 are normally not compacted in the embossing process. It will be apparent to one skilled in the art that there may be small transition regions bordering the embossments 13, 23 and having a density intermediate the density of the embossments 13, 23 and the density of the non-embossed regions 15, 25. Such transition regions are a normal and expected artifact of the manufacturing process and are not to be confused with either the embossments 13, 23 or the non-embossed regions 15, 25.

Figure 5:
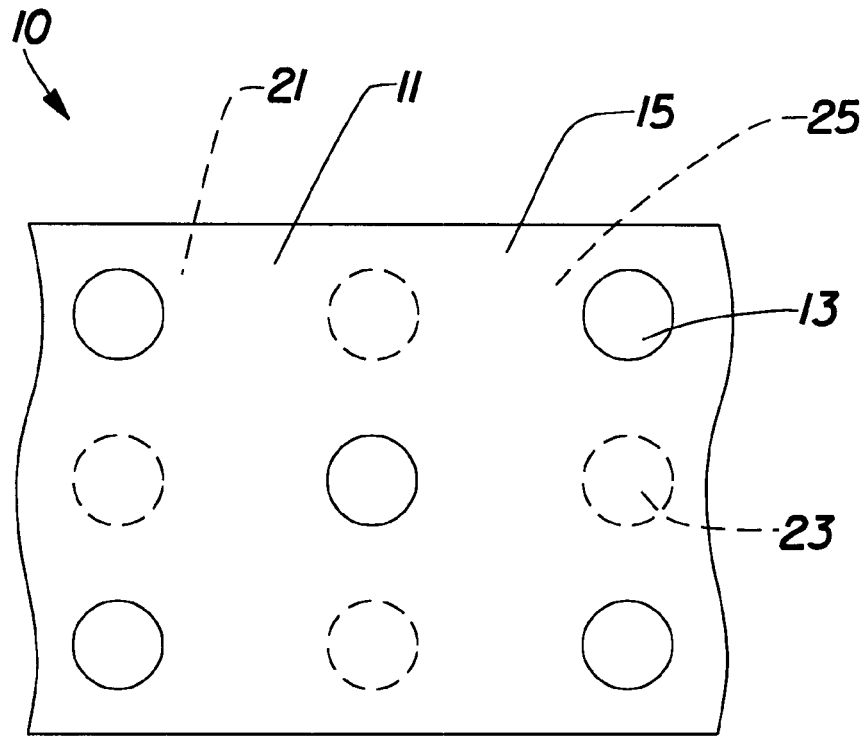
FIG. 5 is a plan schematic view of the structure of the present invention showing essentially non-embossed continuous regions of the sheets.

If the structure 10 is to be used as a consumer product, such as a paper towel, a facial tissue, a toilet tissue, and the like, the non-embossed regions 15, 25 are preferably essentially continuous in two orthogonal directions within the plane of the structure 10. It is not necessary that such orthogonal directions be parallel and perpendicular the edges of the finished product or the direction of manufacture of the product (machine direction, or "MD"). It is preferred, however, that the tensile strength be imparted to the cellulosic structure 10 in two orthogonal directions, so that any applied tensile loading may be more readily accommodated without premature failure of the product due to such tensile loading. Preferably, at least one continuous direction is parallel to the direction of expected tensile loading of the finished product, according to the present invention. An example of the essentially continuous non-embossed regions 15 (associated with the first sheet 11) and 25 (associated with the second sheet 21) is illustrated in FIG. 5. Interruptions in the regions 15, 25 are tolerable, although not preferred, as long as such interruptions do not substantially adversely affect the material properties of the regions 15, 25 of the structure 10.

As FIGS. 3A–3G show, the first sheet 11 and the second sheet 21 are joined together in a face-to-face relationship. If both the first sheet 11 and the second sheet 21 are embossed, the sheets 11 and 21 may be joined according to any one of the four general lamination patterns discussed in the "Background of the Invention" above. Different types and configurations of the embossments, which could be applied to the embossments 13, 23, could also be found in several patents referred to in the "Background of the Invention." As will be apparent from the following description of the present invention, the particular types and configurations of the embossments 13, 23 are not critical for the present invention.

Figure 3A:
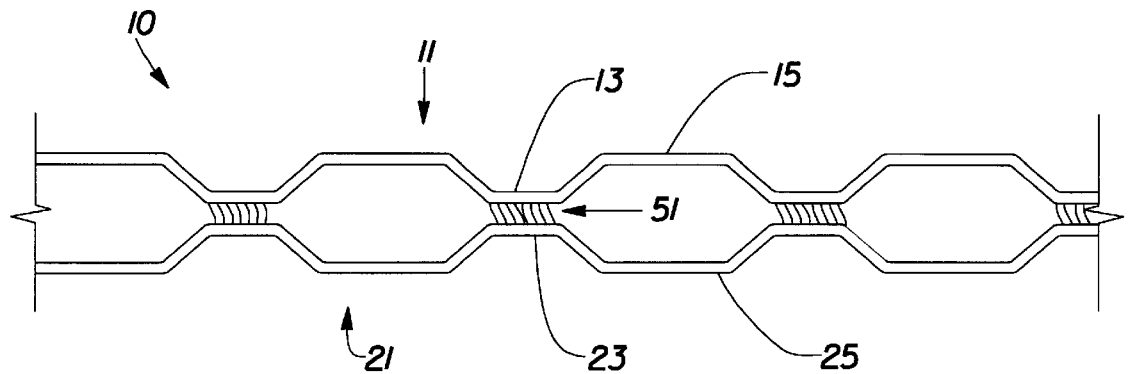
FIGS. 3A, 3B, 3C, 3D, 3E, 3F, 3G, and 3H are schematic drawings showing enlarged cross-sections of the different embodiments of the laminated structure of the present invention comprising two sheets.
Figure 3B:
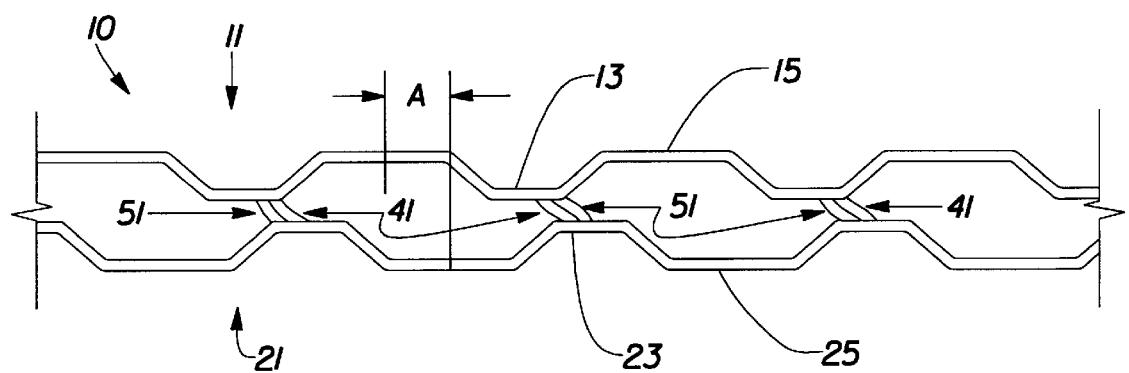
Figure 3C:
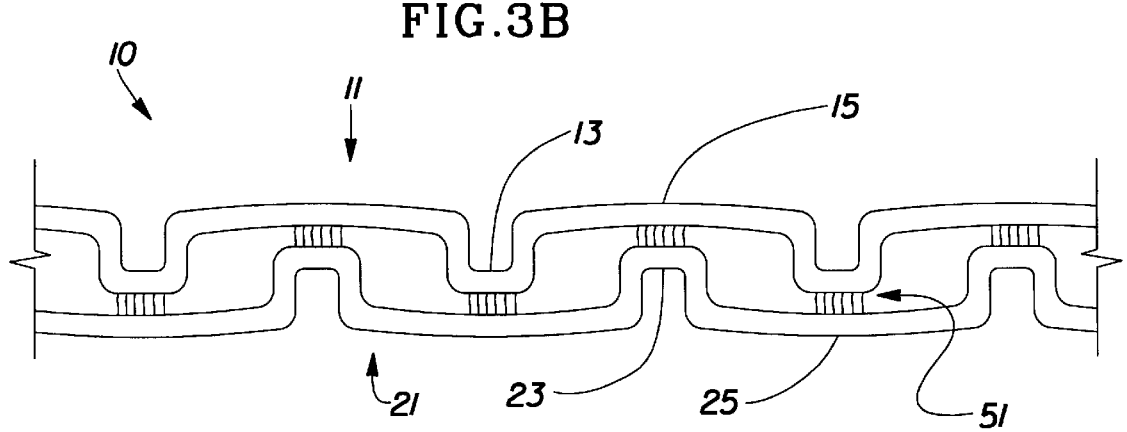
Figure 4A:
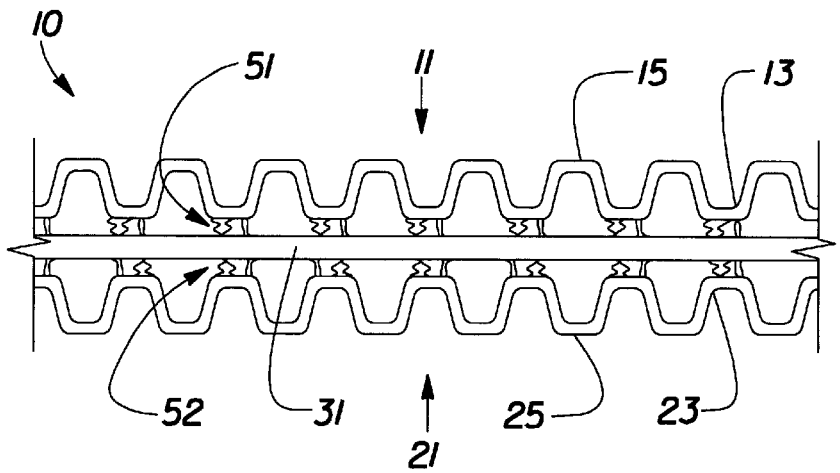
FIGS. 4A, 4B, and 4C are schematic drawings showing enlarged cross-sections of the different embodiments of the three-ply laminated structure of the present invention.
Figure 4B:
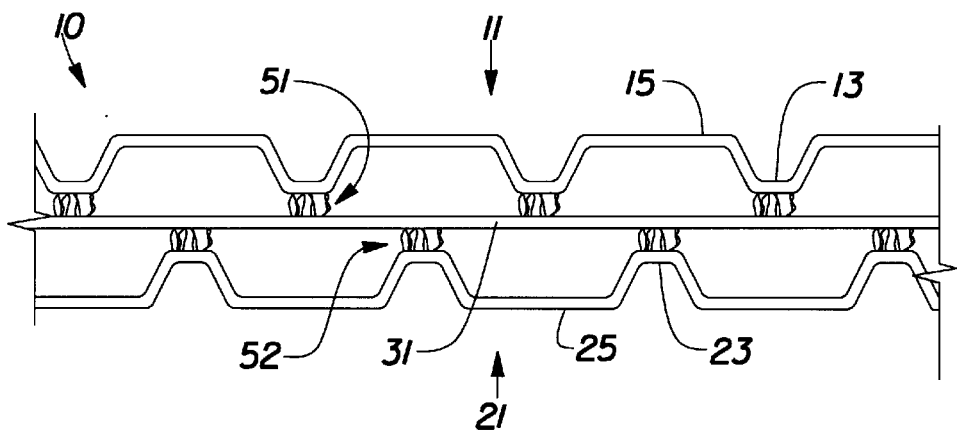

As used herein, the term "knob-to-knob" lamination refers to the type of patterns shown in FIGS. 3A, 3B, 4A, and 4C. In the knob-to-knob pattern, the first sheet 11 having the embossments 13 and the second sheet 21 having the embossments 23 are joined at their respective embossments' distal surfaces, either directly (FIGS. 3A, 3B), or through a third sheet 31 (FIG. 4A). FIG. 3A shows the first sheet 11 and the second sheet 21 joined at the distal surfaces of their respective embossments 13 and 23 which are aligned relative each other. It should be pointed out that the embossments 13 of the first sheet 11 need not be identical to the embossments 23 of the second sheet 21, nor need the embossments 13 be perfectly aligned with the embossments 23. FIG. 3B shows the first sheet 11 and the second sheet 21 joined at the distal surfaces of their respective embossments 13 and 23 which are off-set relative each other. Also, the first sheet 11 and the second sheet 21 need not have the same properties, such—for example—as caliper and basis weight. The first sheet 11 and the second sheet 21 may be made from the different materials. Moreover, the structure 10 of the present invention may even comprise a heterogeneous laminated structure. By the term "heterogeneous laminated structure" it is meant that at least one of the individual sheets (for example, the first sheet 11) of the laminated structure 10 can be distinguished from at least one of the other individual sheets (for example, the second sheet 21) in terms of at least one such properties as caliper, macro-density, basis weight, texture, fiber furnish, etc. In a contrast, a "homogeneous laminated structure" is the structure 10 having the individual sheets 11, 21 which are made with substantially the same composition of material (fiber furnish and additives), and are all substantially identical to one another with respect to all of the above properties (i. e., for any of the above properties, the maximum sheet to sheet difference of the particular property is less than about 10% of the lower value of that property).

Figure 4C:
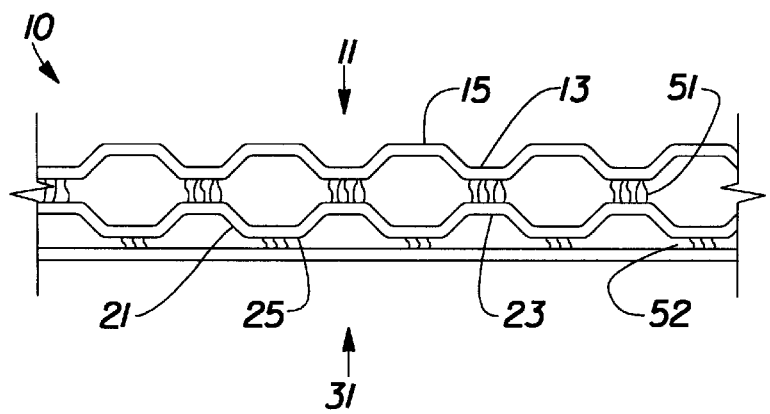

FIGS. 4A, and 4C show the other embodiments of the structure 10 having the knob-to-knob pattern, and comprising three sheets 11, 21 and 31 in various combinations. One skilled in the art will readily understand that other permutations of the embodiments having the knob-to-knob pattern are possible and may be utilized in the present invention.

Figure 3D:
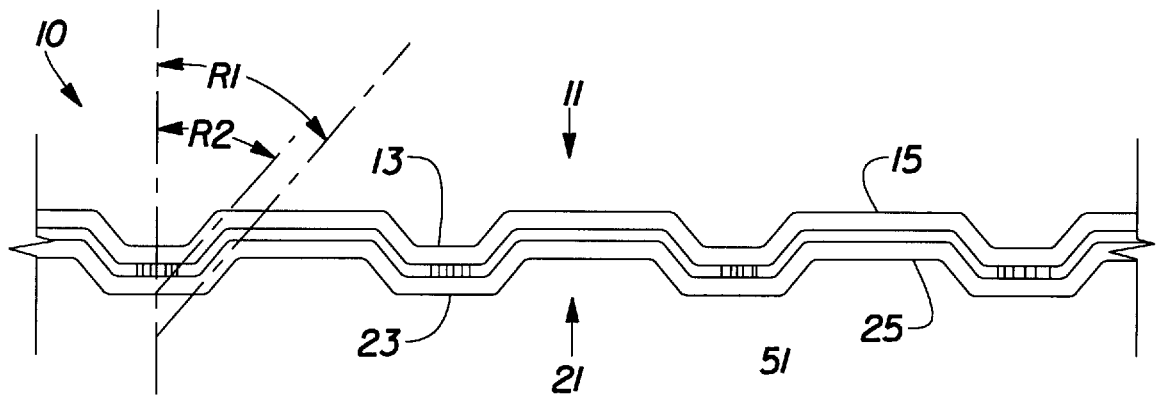
Figure 3E:
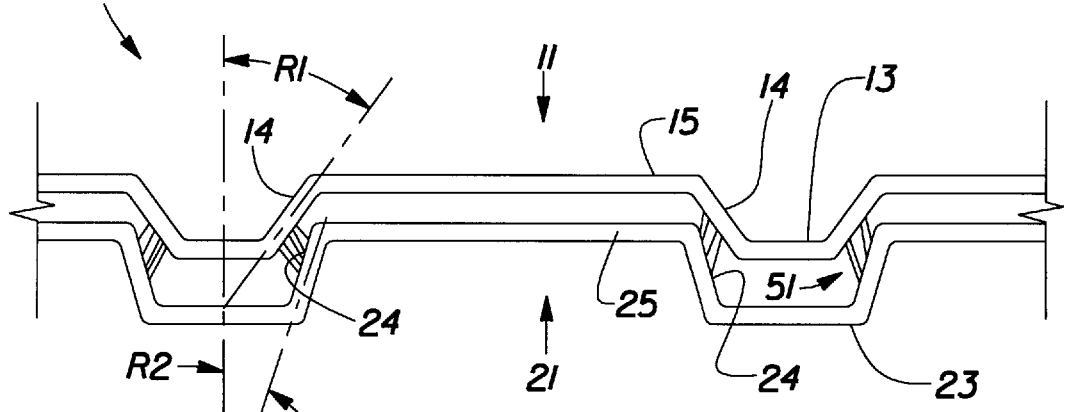
Figure 3F:
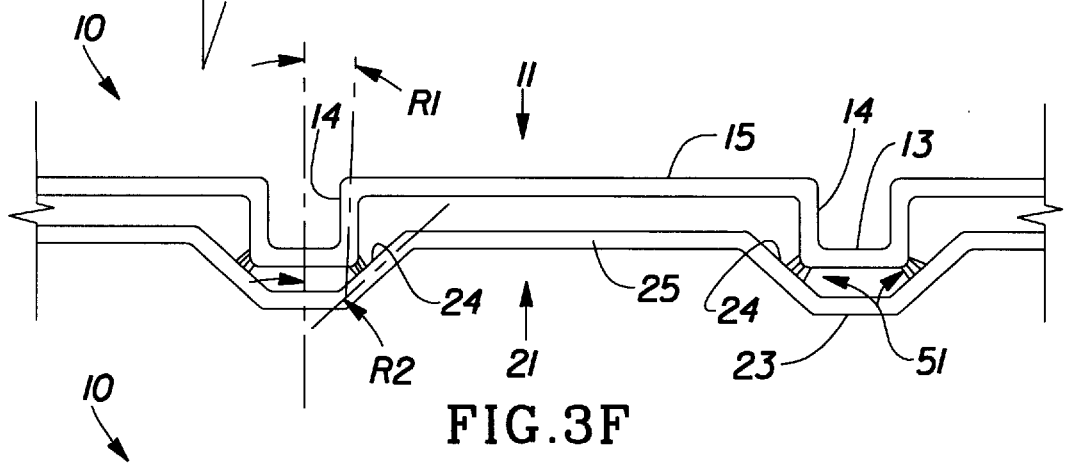
Figure 3G:
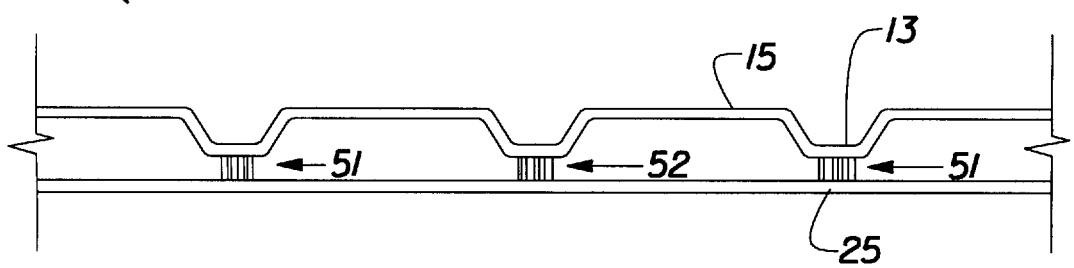
Figure 3H:
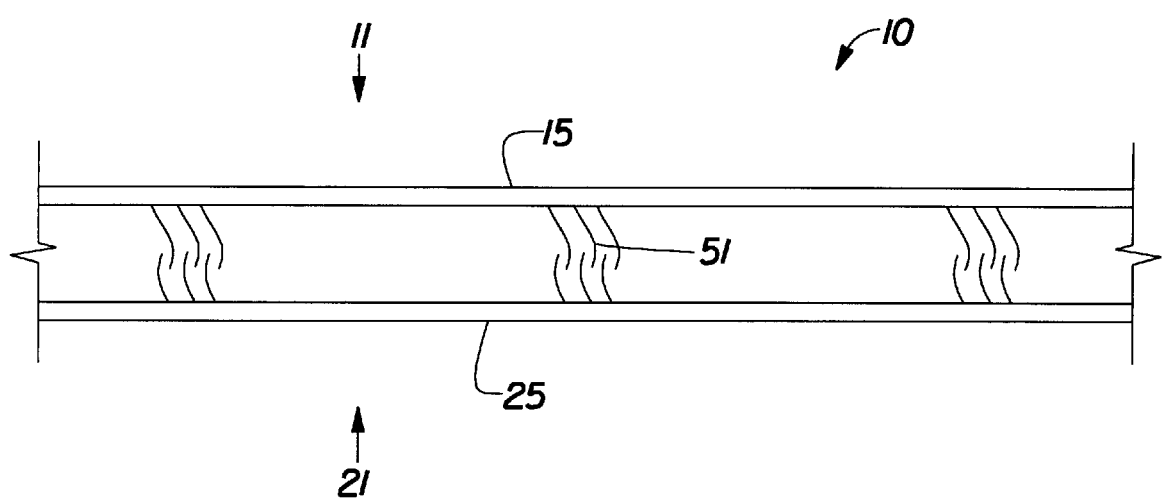

As used herein, the term "nested" lamination refers to the patterns shown in FIGS. 3D, 3E, and 3F. As these figures show, and the term "nested" suggests, the first sheet 11 is joined to the second sheet 21 such that the embossments 13 ("male" elements) of the first sheet 11 are located, or "nested," in the corresponding debossments 23 ("female" elements) of the second sheet 21. Analogously to the knob-to-knob pattern discussed above, in the nested pattern, the embossments 13 of the first sheet 11 need not be identical to the debossments 23 of the second sheet 21, nor need the embossments 13 be perfectly aligned with the debossments 23. In the embodiments of the laminated structure 10 having the nested pattern and shown in FIGS. 3E and 3F, the first sheet 11 has its own included angle of embossment R1, and the second sheet 21 has its own included angle of embossment R2, different from the angle R1. In FIG. 3E, the included angle R1 of the embossment 13 of the first sheet 11 is greater than the included angle R2 of the embossment 23 of the second sheet 21. In FIG. 3F, the included angle R1 of the embossment 13 of the first sheet 11 is less than the included angle R2 of the embossment 23 of the second sheet 21. As used herein, the term "included angle of the embossment" refers to the angle formed by side walls 14, 24 of the embossment 13, 23 and a perpendicular to the plane of the paper sheet 11, 21, taken in a vertical cross-section, as shown in FIGS. 3E and 3F. As is the case with the knob-to-knob pattern described hereabove, a third paper sheet can be joined to one of the first sheet 11 and second sheet 21 connected in the nested pattern.

FIG. 3C shows another embodiment of the paper structure of the present invention, having a dual ply lamination pattern. As has been noted above, the dual ply lamination is described in the commonly assigned U.S. Pat. No. 5,468, 323, issued Nov. 21, 1995 to McNeil, which patent is incorporated by reference herein. As FIG. 3C shows, the embossments 13 of the first sheet 11 are joined to the non-embossed regions 25 of the second sheet 21, and the embossments 23 of the second sheet 21 are joined to the non-embossed regions 15 of the first sheet 11.

Figure 2A:
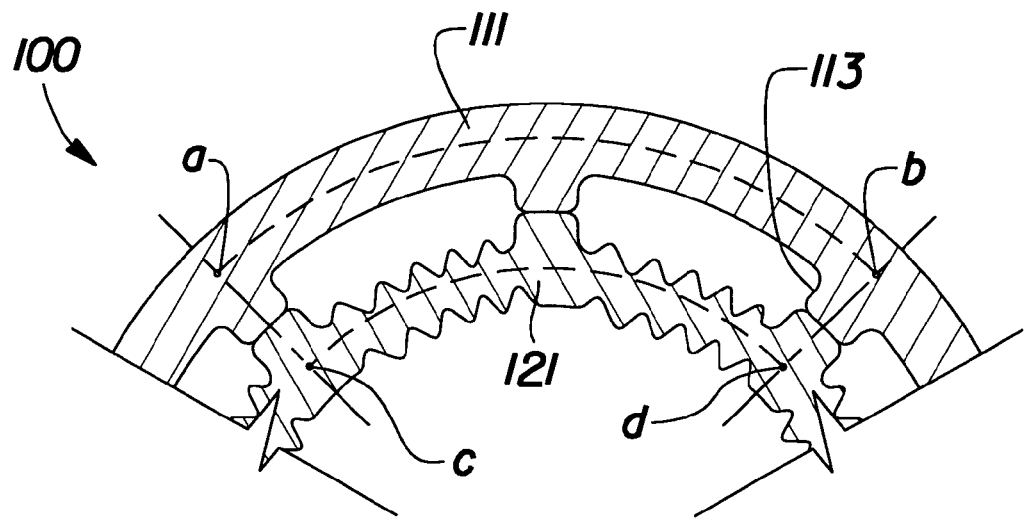
FIG. 2A is a schematic drawing showing an enlarged cross-section of a laminate of the prior art, which laminate is bent.

In the laminated paper structures of the prior art, laminae are rigidly joined together (usually, by an adhesive or mechanically, or by a combination thereof) such that during the use of the laminated structure, the relative movement of the individual sheets forming the laminated structure is not possible without tearing or separation of the individual sheet. Therefore, during the use, when the laminated structure is naturally subjected to bending, rumpling, creasing, and so on, the rigid connection of the individual sheets comprising the laminates of the prior art affects the flexibility of these laminates. FIG. 2A schematically shows a fragment of a two-ply laminated structure 100 of the prior art. The structure 100 comprises a sheet 111 and a sheet 121, the sheets 111 and 121 being rigidly interconnected. The structure 100 is bent such that the sheet 111 is curved outwardly and the sheet 121 is curved inwardly. The sheet 111 is in tension, and the sheet 121 is in compression. In FIG. 2A, a dashed line a-b represents an average length of a curvature of the sheet 111 formed by bending the laminate 100 of the prior art between two pairs of corresponding embossments 113 and 123. Analogously, a dashed line c-d represents an average length of a curvature of the sheet 121 formed by bending the laminate 100 between the same two pairs of the corresponding embossments 113 and 123. The point "a" must radially correspond to the point "c," and the point "b" must radially correspond to the point "d" —because of the rigid connection between the sheets 111 and 121 at the points a-c and b-d. One skilled in the art will readily understand that the length of the curvature c-d associated with the sheet 121 must be less than the length of the curvature a-b associated with the sheet 111. Therefore, when the laminate 100 becomes bent as shown in FIG. 2A, a sheet 121 must foreshorten more extensively relative the sheet 111—to accommodate the smaller length of the curvature c-d associated with the sheet 121. Otherwise, the integrity of one of the sheets 111 and 121 or their connection may be violated (not shown). Not intending to be limited by theory, the applicant believes that the resistance to rumpling (which may include both bending and buckling) of the sheet 121 affects the flexibility of the laminate 100 of the prior art.

Figure 2B:
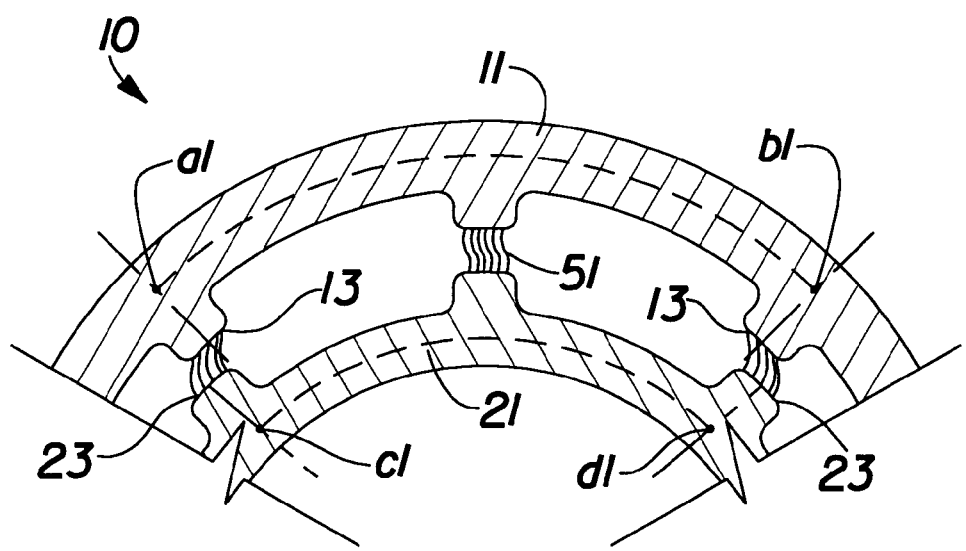
FIG. 2B is a schematic drawing showing an enlarged cross-section of a laminated structure of the present invention, which structure is bent.

In sharp contrast with the prior art, the individual sheets 11, 21 of the laminated structure 10 of the present invention are able to move relative to each other during the use of the structure 10 by a consumer, without tearing of either the first sheet 11 or the second sheet 21, or separation of the first sheet 11 from the second sheet 21. The ability of the individual sheets 11, 21 which form the laminated structure 10 to move relative each other is accomplished by providing a non-rigid, flexible connection between the sheets 11, 21. Preferably, the sheets 11, 21 are laterally movable relative each other, as FIG. 2B shows. The laminated structure 10 is bent such that the sheet 11 is curved outwardly and the sheet 21 is curved inwardly. In FIG. 2B, a dashed line a1-b1 represents an average length of a curvature of the sheet 11 formed by bending the structure 10 of the present invention between two pairs of the corresponding embossments 13 and 23. A dashed line c1-d1 represents an average length of a curvature of the sheet 21 formed by bending the laminate 10 between the same pair of the corresponding embossments 13 and 23. Due to the movable connection (created, for example, by the use of the bonding material 51) between the sheets 11 and 21, the embossments 23 of the sheet 21 can laterally move relative the corresponding embossments 13 of the sheet 11. As could be seen in FIG. 2B, due to the movable connection between the sheets 11 and 21, the sheet 21 need not foreshorten to accommodate the bending of the structure 10—because now the curvature a1-b1 associated with the sheet 11 can retain essentially the same length as the length of the curvature c1-d1 associated with the sheet 21. Thus, the movable connection between the sheets 11 and 12 minimizes excessive tension and/or compression of the sheets 11 and 12.

In one embodiment, shown in FIG. 3A, the first sheet 11 and the second sheet 21 of the laminated structure 10 of the present invention are joined together by a first bonding material 51 which allows relative movement of the sheets 11 and 21. If desired, a second bonding material 52, different from the first bonding material 51, may be used in the laminated structure 10 of the present invention. For example, as shown in FIG. 4C, in the laminated structure 10 comprising three (or more) sheets 11, 21, 31, a second bonding material 52 is used to connect the third sheet 31 to one of the first sheet 11 and the second sheet 21. Of course, the same bonding material (either the first bonding material 51 or the second bonding material 52) may be used to join the sheets 11, 21, 31 together. Also, two or more different bonding materials 51, 52 may be used, if desired, to join the first sheet 11 and the second sheet 21.

In another embodiment of the present invention, shown in FIG. 3B, at least one of the first sheet 11 and the second sheet 21, for example the first sheet 11, has upstanding fibers 41 on one of its surfaces. These upstanding fibers 41 can be integral with the first sheet 11 and formed by brushing the predetermined areas of the surface of the first sheet 11. Alternatively, the fibers 41 can be discretely attached to the surface of the first sheet 11 in the predetermined areas. It is believed that the upstanding fibers 41, when combined with the bonding material 51, 52, will facilitate the process of joining the first sheet 11 and the second sheet 21 and afford the sheets 11 and 21 relative mobility when the resulting laminated structure 10 is formed.

Figure 6:
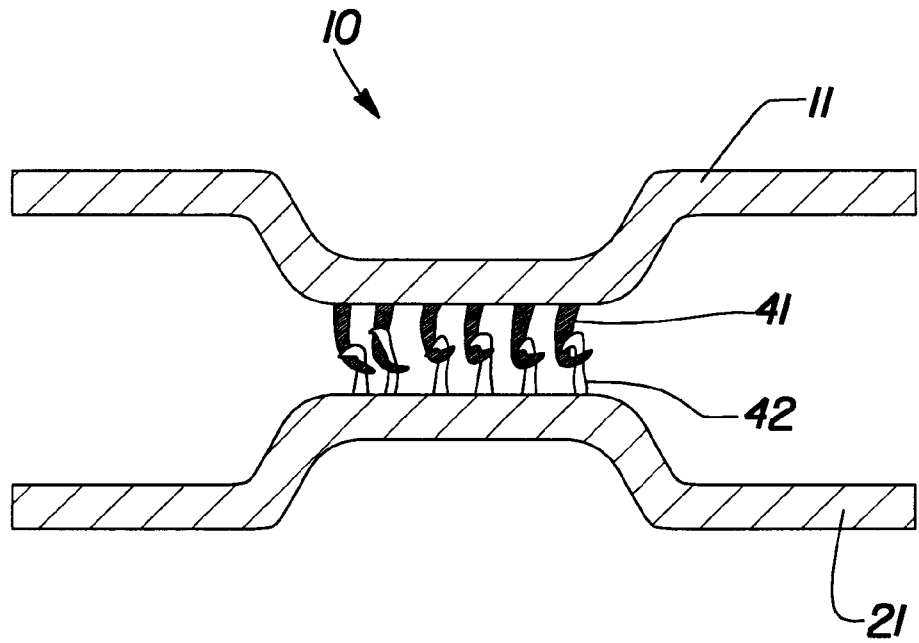
FIG. 6 is an enlarged cross-sectional schematic drawing of a two-ply structure of the present invention showing the upstanding fibers of one sheet mechanically engaging the upstanding fibers of the other sheet.

In another embodiment shown in FIG. 6, the first sheet 11 has the portions of the upstanding fibers 41, and the second sheet 21 have the portions of the upstanding fibers 42, which portions are located in the mutually corresponding surface areas of the first sheet 11 and the second sheet 21, respectively, such that when the first sheet 11 and the second sheet 21 are being joined together, their respective portions of the upstanding fibers 41 and 42 generally coincide. In the latter case, the first sheet 11 and the second sheet 21 may be joined by their respective upstanding fibers 41, 42 and without the use of the bonding material 51, 52, as shown in FIG. 6. As FIG. 6 shows, the upstanding fibers 41 of the first sheet 11 mechanically engage the upstanding fibers 42 of the second sheet 21.

Without being limited by theory, the applicant believes that the laminated structure 10 of the present invention formed by the individual sheets 11, 21 movably joined together possesses higher flexibility and increased caliper, and may provide the improved absorbency—compared to the laminated structures of the prior art formed by the individual sheets rigidly joined together but otherwise having substantially the same properties as the individual sheets 11, 21 forming the structure 10 of the present invention.

Process for Manufacturing Laminated Fibrous Structure

Figure 1B:
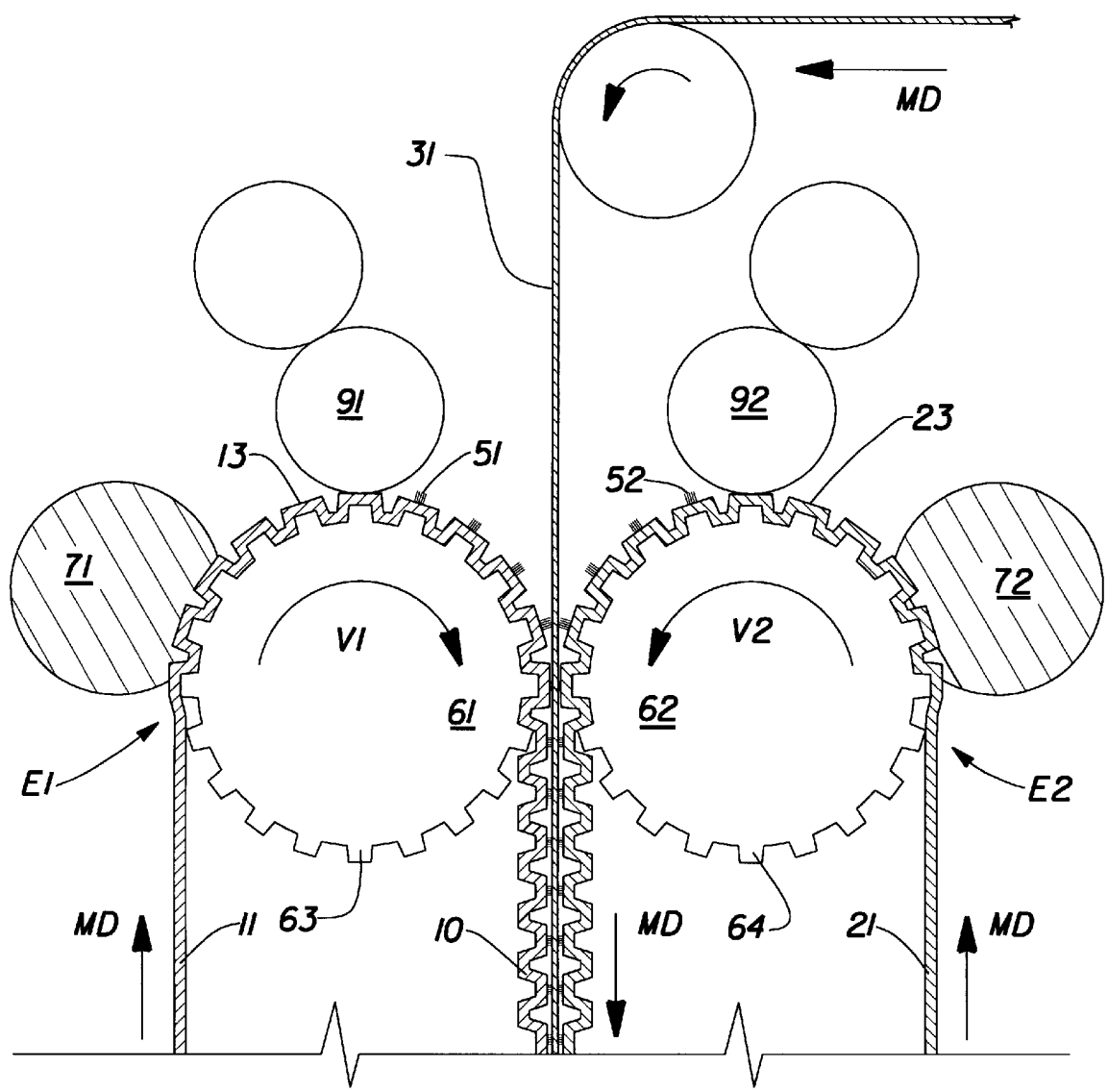

FIGS. 1A and 1B schematically show an apparatus utilized in a process of the present invention. Referring to FIG. 1A, two fibrous sheets 11 and 21 are fed into nips E1 and E2 formed by embossing rolls 61 and 62 and resilient pressure rolls 71 and 72, respectively. The sheets 11, 21 are preferably, but not necessarily, extensible. The embossing rolls 61 and 62 are made of a substantially rigid material, such as steel, and are provided with embossing patterns. The pressure rolls 71 and 72 are made of a flexible and resilient material, such as rubber. The embossing rolls 61, 62 are juxtaposedly mounted for cooperative rotation by suitable drive means about their respective parallel axes. The embossing rolls 61, 62 form a marrying nip N therebetween. The pressure rolls 71, 72 are mounted for rotation by any suitable drive means about their respective parallel axes, and are cooperatively disposed in juxtaposed positions relative the embossing rolls 61, 62, respectively, to form the embossing nips E1 and E2 therebetween. The sheets 11 and 21 are forwarded through the nips E1 and E2 and are embossed by passing through the nips E1, E2. While the embossing of either one or both of the individual sheets 11, 21 by passing them through the nips E1, E2, respectively, is preferred, any embossing method is satisfactory for use in the process of the present invention.

After the embossed patterns of discrete embossments 13, 23 are formed on the sheets 11, 21 by the action of the nips E1, E2, respectively, the sheets 11, 21 remain in arcuate contact with the embossing pattern on the embossing rolls 61, 62, respectively, as the embossing rolls 61, 62 rotate. The embossing rolls 61, 62 are rotatably driven at surface velocities V1 and V2, respectively. Preferably, the surface velocity V1 of the embossing roll 61 is equal to the surface velocity V2 of the embossing roll 62. The methods of tension control and speed adjustment are well known in the art and are not critical for the present invention.

As has been discussed above, the sheets 11 and 21 can be joined together by any one of the following methods: (1) connecting the sheets 11 and 21 by using a bonding material which would allow the sheets 11 and 21 to remain movable relative each other after the laminated structure 10 has been created; (2) creating upstanding fibers 41 on the first sheet 11 and upstanding fibers 42 on the second sheet 21, and then making the fibers 41 mechanically engage the fibers 42 such as to make the sheets 11 and 21 to join each other and, at the same time, remain movable relative each other after the laminated structure 10 has been created; and (3) combining the method (1) and the method (2), i. e., creating the portions of the upstanding fibers 41 and/or 42 on one or both of the sheets 11 and 21, and then joining the sheets 11 and 21 by using both the bonding material 51 and/or 52 and the upstanding fibers 41 and/or 42.

Joining Sheets by Using Bonding Material

As FIGS. 1A and 1B show, the first sheet 11 and the second sheet 21, after having passed the embossing nips E1, E2 formed by the embossing rolls 61, 62 and the pressure rolls 71, 72, respectively, are in the arcuate contact with the rotating embossing rolls 61 and 62, respectively. Then, the bonding material 51 is deposited on the first sheet 11. Alternatively, the bonding material 52 may be deposited on the second embossing roll 62. If desired, both the bonding material 51 and the bonding material 52 may be deposited on both the paper web associated with the embossing roll 61 and the paper web associated with the embossing roll 62, respectively. As has been pointed out above, the first bonding material 51 may be identical to the second bonding material 52. The first and second bonding material 51, 52 may comprise polyurethane latex or thermosetting adhesive. Foam may also be utilized as the bonding material 51, 52.

If either one or both the first sheet 11 and the second sheet 21 are embossed, the bonding material 51, 52 is preferably deposited on the distal surfaces of the embossings 13 on the first sheet 11 and/or embossings 23 on the second sheet 21. The method of depositing the bonding material on the sheets 11, 21 is not critical for the present invention. In FIGS. 1A and 1B, the device for depositing the bonding material 51, 52 is schematically shown as two pairs of applicator rolls 91, 92 juxtaposed in axially parallel relationship with the embossing rolls 61, 62, respectively, but it should be understood that other suitable methods of depositing the bonding material 51, 52 may be utilized in the process.

As FIG. 1A shows, after the bonding material 51 and/or 52 has been deposited on one or both of the first sheet 11 and the second sheet 21, the first sheet 11 and the second sheet 21 are forwarded to the marrying nip N, where they will be movably joined in a face-to-face relationship to form the laminated structure 10 of the present invention.

If the resulting laminated structure 10 is to have the knob-to-knob pattern of lamination (which has been discussed hereinabove), the embossing rolls 61 and 62 are registered such that the first sheet 11 and the second sheet 21 are joined at the distal surfaces of at least some of their respective, and preferably registered, embossments 13 and 23. If the resulting laminated structure 10 is to have the nested pattern of lamination (which has also been discussed herein above), the embossing rolls 61 and 62 are registered such that the embossments 13 on the first sheet 11 may be joined to the debossments 23 of the sheet 21 as shown in one of FIGS. 3D, 3E, and 3F. If the resulting laminated structure 10 is to have the dual ply lamination pattern (which has also been discussed hereinabove), the embossing rolls 61 and 62 are registered such that the embossments 13 on the first sheet 11 may be joined to the non-embossed areas 25 of the second sheet 21, and the embossments 23 of the second sheet 21 may be joined to the non-embossed areas 15 of the first sheet, as shown in FIG. 3C.

If desired, a third sheet 31 may be interposed between the first sheet 11 and the second sheet 21 to form a three-ply laminated structure 10, as shown in FIG. 1B. Although FIG. 1B shows the third sheet 31 as a non-embossed sheet, the embossed third sheet 31 (not shown) may also be utilized in the present invention.

Joining Sheets by Engaging Their Upstanding Fibers

While the sheets 11, 21 are in arcuate contact with the rolls 61 and 62, portions of upstanding fibers 41 associated with the first sheet 11 and/or portions of upstanding fibers 42 associated with the second sheet 21 are created on the respective sheets 11, 21. The upstanding fibers 41 and 42 may be created by any method known in the art. For example, integral upstanding fibers 41, 42 may be created by brushing the embossed areas of the sheets 11, 21 using brushing rolls 81, 82, as shown in FIG. 1. As used herein, the upstanding fibers 41, 42 are integral with the sheets 11, 21, respectively, if the upstanding fibers 41, 42 are inherent elements of the sheets 11, 21, respectively. Alternatively, the upstanding fibers 41, 42 may be discretely attached to the sheets 11, 21. The discretely attached fibers 41, 42 may comprise a material different from the material of the sheets 11, 21.

After the upstanding fibers 41, 42 have been created, the first sheet 11 and the second sheet 21 are forwarded to the nip N to be joined in a face-to-face relationship such that the upstanding fibers 41 of the first sheet 11 face the upstanding fibers 42 of the second sheet 21. By passing through the nip N, the upstanding fibers 41 of the first sheet 11 mechanically engage the upstanding fibers 42 of the second sheet 21, thus movably joining the first sheet 11 and the second sheet 21 together such that the first sheet 11 and the second sheet 21 are movable relative each other without tearing or separation of either the first sheet 11 or the second sheet 21.

Joining Sheets by Using Upstanding Fibers and Bonding Material

At least one of the first sheet 11 and the second sheet 21 may be treated to create the upstanding fibers 41 or 42, respectively. Of course, the upstanding fibers 41, 42 may be created on both the first sheet 11 and the second sheet 21. For example, the first sheet 11 is treated to have the portions of upstanding fibers 41. Then, the bonding material 51 may be deposited directly on the portions of the upstanding fibers 41, and preferably to the free ends of the upstanding fibers 41.

Alternatively, the bonding material 52 may be deposited on the second sheet 21 which has no upstanding fibers. In the latter case, the bonding material 52 is preferably deposited in the areas that will correspond to the portions of the upstanding fibers 41 on the first sheet 11 when the first sheet 11 and the second sheet 21 are disposed in a face-to-face relationship in the nip N. Thus, the upstanding fibers 41 of the first sheet 11 engage the bonding material 52 deposited on the second sheet 21 to movably join the first sheet 11 and the second sheet 21 to form the laminated structure 10 of the present invention such that the first sheet 11 and the second sheet 21 are movable relative each other without tearing of either the first sheet or the second sheet or separation of the first sheet from the second sheet.

What is claimed is:

1. A laminated fibrous structure, comprising at least a first sheet and a second sheet movably joined together in a face-to-face relationship by a plurality of movable connections interconnecting said sheets at their face-to-face corresponding portions such that said portions of said first sheet are movable relative to the corresponding portions of said second sheet without tearing of either said first sheet or said second sheet.

2. The laminated structure according to claim 1, wherein said first sheet is embossed.

3. The laminated structure according to claim 2, wherein said second sheet is embossed.

4. The laminated structure according to claim 3, wherein said first sheet and said second sheet are movably joined together in a knob-to-knob pattern.

5. The laminated structure according to claim 3, wherein said first sheet and said second sheet are movably joined together in a nested pattern.

6. The laminated structure according to claim 3, wherein said first sheet and said second sheets are movably joined together in a dual ply lamination pattern.

7. The laminated structure according to claim 2, further comprising a bonding material movably joining said first sheet and said second sheet.

8. The laminated structure according to claim 1, wherein said first sheet and said second sheet are laterally movable relative each other.

9. The laminated structure according to claim 1, wherein said first sheet has upstanding fibers facing said second sheet.

10. The laminated structure according to claim 9, wherein said second sheet has upstanding fibers facing said first sheet.

11. The laminated structure according to claim 10, wherein said upstanding fibers of said first sheet mechanically engage said upstanding fibers of said second sheet to movably connect said first sheet to said second sheet to form said laminated structure.

12. The laminated structure according to claim 11, wherein said upstanding fibers of at least one of said first sheet and said second sheet are integral with said at least one of said first sheet and said second sheet.

13. The laminated structure according to claim 11, wherein said upstanding fibers of at least one of said first sheet and said second sheet are discretely attached to said at least one of said first sheet and said second sheet.

14. A process for manufacture of a laminated fibrous structure, which process comprises the steps of:

providing at least a first fibrous sheet and a second fibrous sheet; disposing said first and second sheets in a face-to-face relationship;

and movably joining portions of said first sheet to face-to-face corresponding portions of said second sheet to create movable connections between said corresponding portions of said first and second sheets, such that said portions of said first sheet are movable relative to the corresponding portions of said second sheet without tearing of either one of said first and second sheets.

15. The process according to claim 14, further comprising the step of embossing at least one of said first and second sheets to create embossments.

16. The process according to claim 15, further comprising the steps of providing a bonding material; and depositing said bonding material on at least one of said first and second sheets.

17. The process according to claim 16, wherein said bonding material is deposited on said embossments.

18. The process according to claim 14, further comprising the steps of creating upstanding fibers on said portions of said first sheet; and joining said at least first and second sheets in said face-to-face relationship such that said upstanding fibers on said first sheet movably engage said corresponding portions of said second sheet to create said laminated fibrous structure.

19. A laminated fibrous structure comprising:

at least two sheets movably joined together in a face-to-face relationship and having face-to-face corresponding portions at which said at least two sheets are movably joined; and a plurality of movable connections interconnecting said corresponding portions of said at least two sheets such that each of said portions of one of said sheets is laterally movable relative to the face-to-face corresponding portion of the other one of said two sheets.

* * * * *